US010027923B1

(12) United States Patent
Chang (10) Patent No.: US 10,027,923 B1
(45) Date of Patent: Jul. 17, 2018

(54) METHODS AND SYSTEM FOR RECORDING, SEARCHING AND FAITHFUL REPRODUCTION OF SENSATIONS

(75) Inventor: Huan Chang, Redwood City, CA (US)

(73) Assignee: Huan Chang, Menlo Park, CA (US)

( * ) Notice: Subject to any disclaimer, the term of this patent is extended or adjusted under 35 U.S.C. 154(b) by 532 days.

(21) Appl. No.: 13/607,893

(22) Filed: Sep. 10, 2012

Related U.S. Application Data

(60) Provisional application No. 61/573,653, filed on Sep. 9, 2011.

(51) Int. Cl.
*H04N 5/92* (2006.01)
*H04N 5/93* (2006.01)

(52) U.S. Cl.
CPC ..................................... *H04N 5/93* (2013.01)

(58) Field of Classification Search
CPC .......... H04N 5/93; H04N 5/85; H04N 9/8042; G11B 27/105; G11B 27/329; G11B 27/034

USPC ......................................................... 386/241
See application file for complete search history.

(56) References Cited

U.S. PATENT DOCUMENTS

| 6,727,971 | B2* | 4/2004 | Lucas ........................... 352/85 |
| 7,076,615 | B1* | 7/2006 | Dalal ........................... 711/154 |
| 2004/0077424 | A1* | 4/2004 | Murphy et al. ................ 472/137 |
| 2006/0210169 | A1* | 9/2006 | Colestock et al. ............ 382/218 |
| 2009/0171902 | A1* | 7/2009 | MacLaurin et al. ............. 707/3 |
| 2012/0130454 | A1* | 5/2012 | Peyman .......................... 607/89 |
| 2012/0136575 | A1* | 5/2012 | Samet et al. .................. 701/540 |

\* cited by examiner

*Primary Examiner* — William Tran (57) ABSTRACT

The present invention discloses methods and system of recording and faithfully reproducing sensations in 3D. The parameters of the recording includes the target volume where the cause of all recorded sensation originate, the observation volume where all supported observers are situated and other positions, orientations, and other situations of the observer are specified. The method of recording and reproducing sensations faithfully in 3D with the additional capability of searching for positions and situations in which an observer may feel a specified sensation. The waxel means to support the recording, reproduction and searching.

20 Claims, 7 Drawing Sheets

METHODS AND SYSTEM FOR RECORDING, SEARCHING AND FAITHFUL REPRODUCTION OF SENSATIONS

INTRODUCTION

Ever since early last century sophisticated attempts have been made to reproduce visual sensations as observed in one place and time in a different place and time by recording sights and then reproducing them later. Frederick Ives being one to seminally patent methods to capture and reproduce images with full parallax in 1902. Efforts to improve the quality of capture continues today both commercially and academically, for example, in Reo Ng 2006 and his company Lytro. Efforts to render reproduction of 3d visual sensations continues today, in volumetric reproductions (Favalora 2005), in light field reproductions patented by Georgiev 2012, and light field research by Juries et al 2007 and Junk et al 2011, Litman et al 2012, Wetzstein et all 2012.

Stereo and surround sound recording and reproduction, though widely practiced, but continues to be an art as new observer situations arise, such as user listening in a car, or in home movie studio, or in a headphone (Weffer 2001).

While these products and methods that records and reproduces sensations generally allows a user to move freely and still experience good 3-dimensional fidelity, most other widely available commercial systems tend to be more restrictive or require modifications to the observer (i.e. requiring 3D glasses to see 3D movies, and the results are still not very good)

Other sensations are also target of recording and reproduction. For example, patent on producing tactile sensations using electric shock by Makinen et al 2011, patent on reproducing taste by Lakkis et al 2012, patent on producing tactile sensations using pins by Rogowitz et al 2012, storing and analyzing high dimensional sensations by Greer et al 2011. However these methods are very sensitive to the observer's location and situation, but do not adequately address these additional parameters of sensing.

More complex sensations such as gravity, falling, hunger, thirst, pain, conditions of the eye, ear, nose and mouth, observer's temperature, happiness and sadness produced not only by sensual neurons sending signals to the brain but also related to psychological or physiological situations of the observer.

Most importantly, these attempts at bettering the art of recording individual type of sensations do not consider the interaction of theses senses in faithfully reproducing the recorded sensation. For example, a hungry person sensing the sight and smell of a cake in silence is far different from the sensation of the same person, full, looking at the same cake hearing and smelling flatulence.

Furthermore, when the existing technologies do combine some of all possible sensations in recording and reproduction, they do not allow for searching for a multitude of sensations. Though description in words lessens the apparent difficulty of the task, one may for instance wish to find "a time and place in the recording where I am both cold and hot at the same tune and a train is whistling very loudly pitch sliding down." And then one may additionally wish to be placed there in the reproduction and experience what that recorded sensations feels like.

Finally, in almost all cases, recording and reproduction are for the purpose of human sensation. Visual sensation are typically stored using coordinates In color space, such as the CIE LAB), that are optimized for perception by the human eye. Sound are generally recorded at most at the Nyquist-Shannon sampling rate of 40 kHz for the typical human hearing range of 20 hz to 20 khz It should be easily conceivable that we wish to produce these sensations for an animal, insect, or other living things, or a robot for the purpose of entertainment, training, deception, therapy or for testing and calibration.

In an example, refer to Gometz 2011 patent on autonomous driving vehicles which uses a multitude of sensors including some used by humans and some not used by humans to drive a car using computer. The calibration and testing of this system can take place such a vehicle in the system of present invention and repeatedly test it's stability in dangerous situations without placing the actual vehicle in danger. The recording of such dangerous situations may be made with sensors placed on a flying machine traveling at much lower rate of speed. Because the recording device is controlled by human, smaller, slower and flying it is not susceptible to the danger that the tested vehicle may be, therefore risking less damage.

In a faithful reproduction, the sensations sensed by the observer with all their relevant faculties should be of good enough quality that the observer believes it to be real. After the observer experiences the reproduction, they may situate in the actual recording situation and location but believe that they may be observing the reproduction. The disadvantages of existing components and systems for recording and faithful sensation reproduction are:

Their reproduction is not faithful in 3D.

Their fidelity fades non-deterministically or in unspecified ways as user's location and other situations changes.

They do not consider additional physiological and psychological conditions of the observer.

They do not consider the possibility that the observer is not a normal human.

They do not typically reproduce sensation beyond sight, sound, moisture and vibrations, nor do they produce any of these sensations at sufficiently high resolutions.

They do not provide means to find where, when and how to be situated within the reproduction to feel a certain complex sensation.

The present invention places sensors and sensation inducing projectors on a device, which we call waxel, in order to orient them. Many of these waxel device which contain orienting sensors and projectors are further arranged, with high density, on a plane-like surface. The surface is then placed so that it may record and project sensations.

In accordance with one embodiment of the presented systems and methods the sensation producing device is to be covered with sensation producing and sensing devices which is connected to the sensation search engine. Such a system can be constructed to overcome these shortcomings of existing sensation recording, producing and searching systems.

DRAWING

Figures

DETAILED DESCRIPTION

Figure 1A:
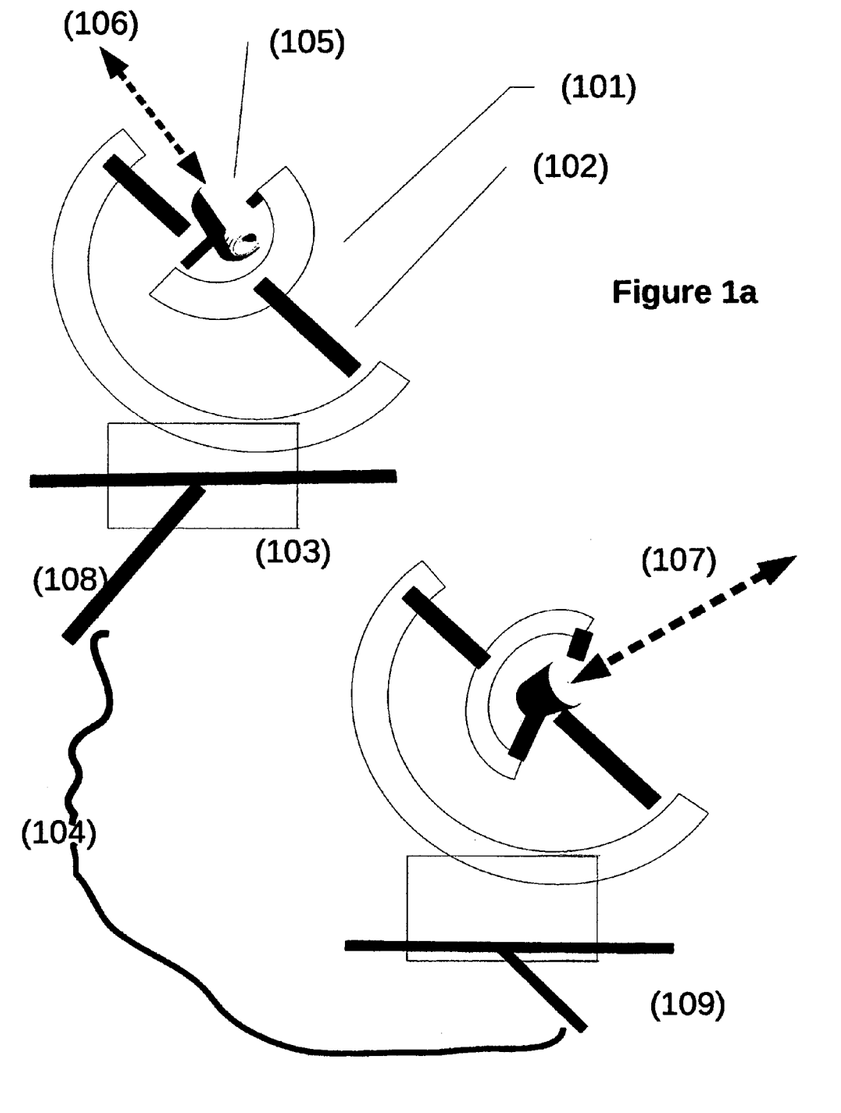
FIG. 1a depicts the construction of two waxels used to record, transmit and produce sensations.

Referring to the invention in detail, FIG. 1 depicts two waxel device. Waxel is a mechanical device that rapidly and accurately orients components that are used to sense and reproduce sensations. The waxel has two dimensions of rotational freedom as well as two linear degrees of freedom. The waxel device is composed of two torsional actuator mounted on two gimbals which provides rotational motive force and freedom (101) and (102). A fixed non-rotating portion of the waxel, the base (103), contains electronic circuit and wired connections (104) for communications to and from this waxel device. Activation of torsional actuator on the waxel rotates to orient the waxel head (105) which contains directional sensors and projectors. Such rotation directs the focus of waxel head which contain members used to sense and reproduce sensations in the direction that waxel head is pointed at (106) and (107). Waxel base (103) is attached to linear actuators (108) that can move the base vertically and horizontally independently. The second waxel (109) depicts a waxel having been rotated and shifted.

In further detail, still referring to the invention of FIG. 1a, each waxel rotates and moves to a location and turned to the desired orientation. A stimulus is emitted and sensors collects data sample. The waxel is then rotated and moved to the next desired orientation and position to produce and record the effects of sensation at that next orientation and position. The waxel must rotate and shift very quickly so that the observer effectively feel that sensation continuously. Current day computer screen refreshes at rate least 60 hz. The waxel must cover each position at least 60 times a second. Some sensations such as heat may not require such highly frequent update as light. For those sensations the refresh rate can be lower.

In further detail, still referring to the invention of FIG. 1a, the sensor and sensation projectors are to be co-located on the waxel head. More than one sensor or projector of each type may be required. Some example include: several light sensors responsible for different wavelengths of light. Another example may be an array of red lasers which are directional visual sensation projectors. Some devices whose performance do not require line of sight may be stacked along the longitudinal axis of waxel head: angular accelerometer may be located behind magnetometer. In one embodiment, the construction of waxel bead is made possible by off-of-the-shelf components by placing camcorders and LED projectors on the waxel head. In this embodiment, the wire connecting waxel to the computer controller are to be standardized connectors such as DisplayPort, HDMI, DVI, VGA, or RCA cable.

Figure 1B:
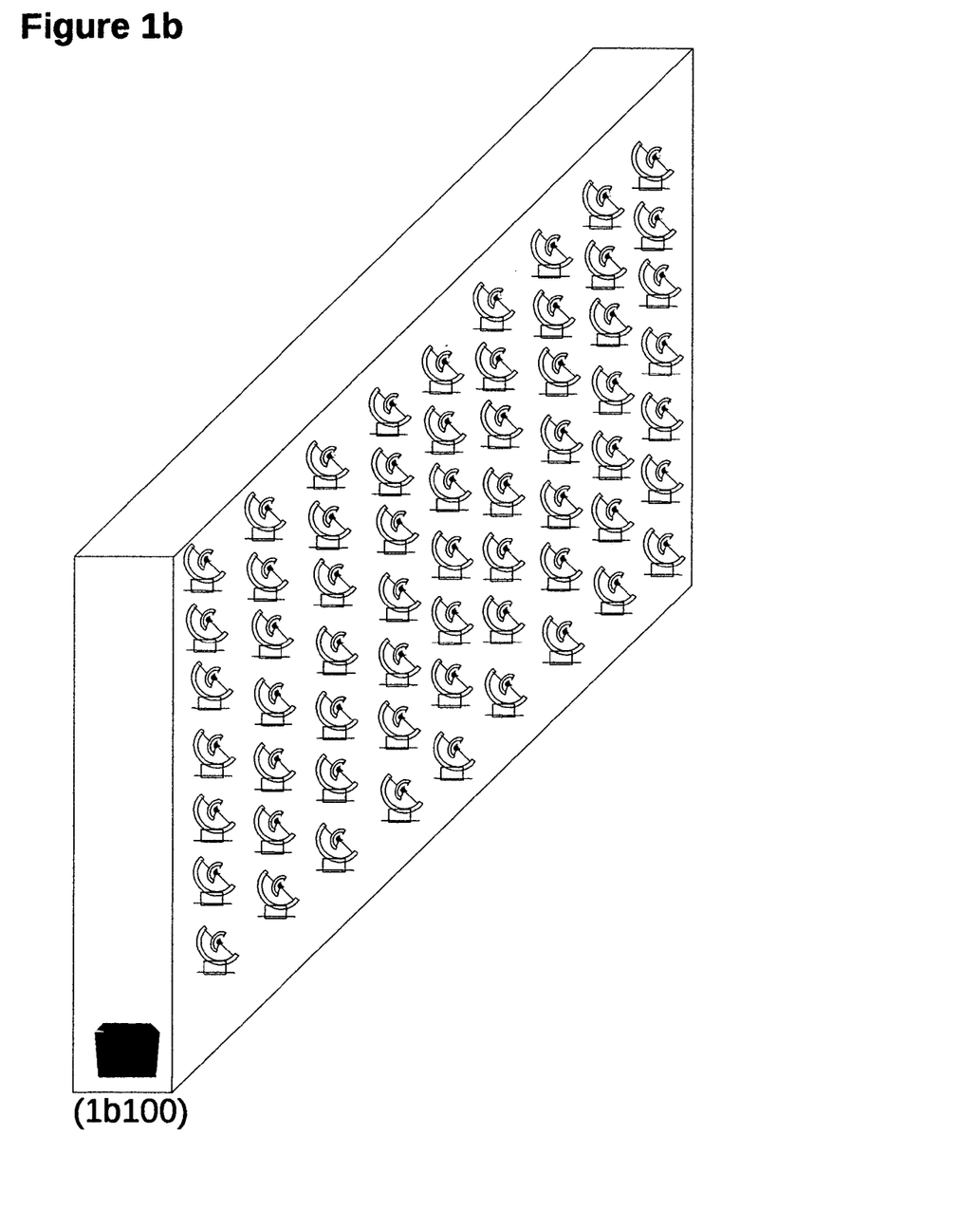
FIG. 1b depicts arrangements of waxel devices on a flat panel.

FIG. 1b depicts an arrangement of waxels on a flat panel. Wires of all waxels are connected to a computer controller (1b100) which receives data from waxels. The computer perform processing, encoding, indexing and stores the data for future search and reproduction. Waxels in this figure are placed with regularity and density which are less than the preferred embodiment for illustration purpose.

Figure 2:
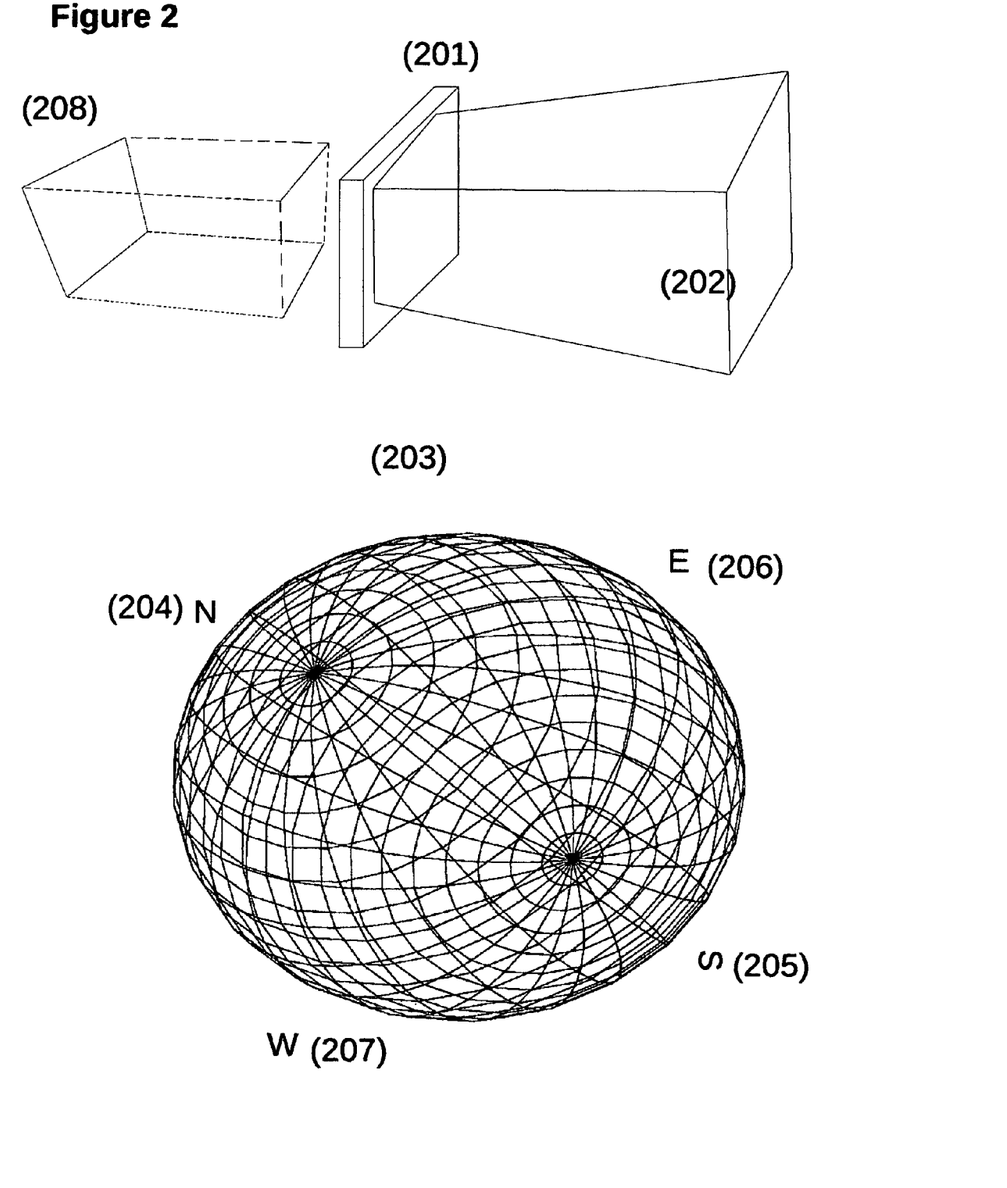
FIG. 2 depicts the layout of two pairs of target and observation volumes dad their respective waxel devices.

FIG. 2 depicts two waxel enabled devices, (201) and (203), one having the same form factor as a television, the waxel TV (201), and a second having spherical shape (203), the waxel room. The waxel TV has waxels covering both sides. The waxel room has waxels on the inside and outside of the sphere. Both waxel TV and room has computer controller, but it is not drawn. The target and observation volumes of each devices are drawn as well. The target volume (208) for the waxel TV (201) is the space in which an embodiment of present invention can record and sensations. The target volume is to be configured by the human operator, but the ultimate its shape is determined and stored by the computer controller. The entire target volume may be a space having higher than three dimensions (not depicted) extending into user situation, time and other dimensions. The observation volume, a trapezoidal (202) for the waxel TV (201) is a second volume configurable by human operator. observation volume is the space within which an observer can make observations of the target volume. Both target volume and observation volume are specified relative to the waxel device and can be translated into real world coordinates so as to be understandable by the human operator so he may located it in actual world.

The waxel enabled device could also be a completely enclosed room with waxels lining the entire inside and outside walls, ceiling and floor. The spherical waxel room (203) provides a completely immersive environment such that no matter which direction a user faces, the sensations will be reproduced. The sphere has four distinct points labeled North (204), South (205), East (206) and West (207). North and South correspond to north and south poles. East and West are two fixed points on opposite ends of the sphere lying on the equator corresponding to the north and south poles. observation volume is the inside of the sphere, the target volume is specified to be the space outside of the sphere. Further, in the case of the spherical waxel device (203), the waxel room may optionally chooose to limit the target volume to be within a sphere that serve the same purpose as the clipping plane, except it would be a clipping sphere.

Further detail, still regarding FIG. 2, the observation volume and the target volume need not have the same physical property, nor do they need to be disjoint. For example the waxel room may be half submerged in water. It may further be configured with a targe volume that is the inside of the sphere and an observation volume that is within a second spherical volume one third submerged and intersecting the semi-submerged target volume. In such situation, the waxel room computer controller must determine which part of the observation volume is feasible.

Figure 3:
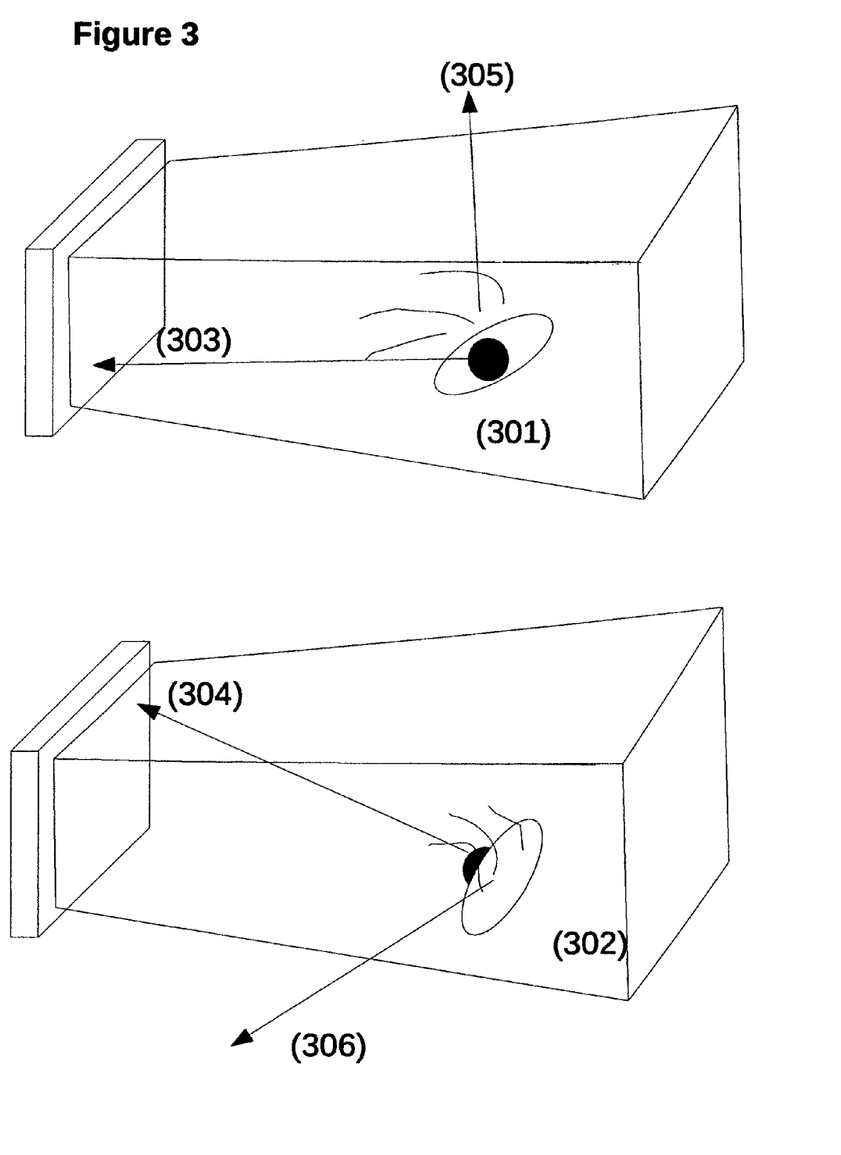
FIG. 3 depicts observers (eyes) within observing volumes in different situations: they have different location and orientation.

FIG. 3 depicts an eye (301) located at a certain position looking towards the lower left corner (303) of the display panel. FIG. 3 also depicts a second eye (302) located at that same certain position but oriented such that it is staring at the upper right corner (304) of the display panel. We depict two of an infinite number of possible orientation situations at that certain point of the observation volume. In addition there are infinite positions that this eye can take within this observation volume. The figure serve to demonstrate why it is necessary to store and reproduce different sensations for different situations of the same eye at the same position—the sensations are different even at the same position but different orientations. Note the top of the head, (305) and (306), are pointing to different directions corresponding to a person sitting upright and a person lying on a sofa respectively.

Figure 4:
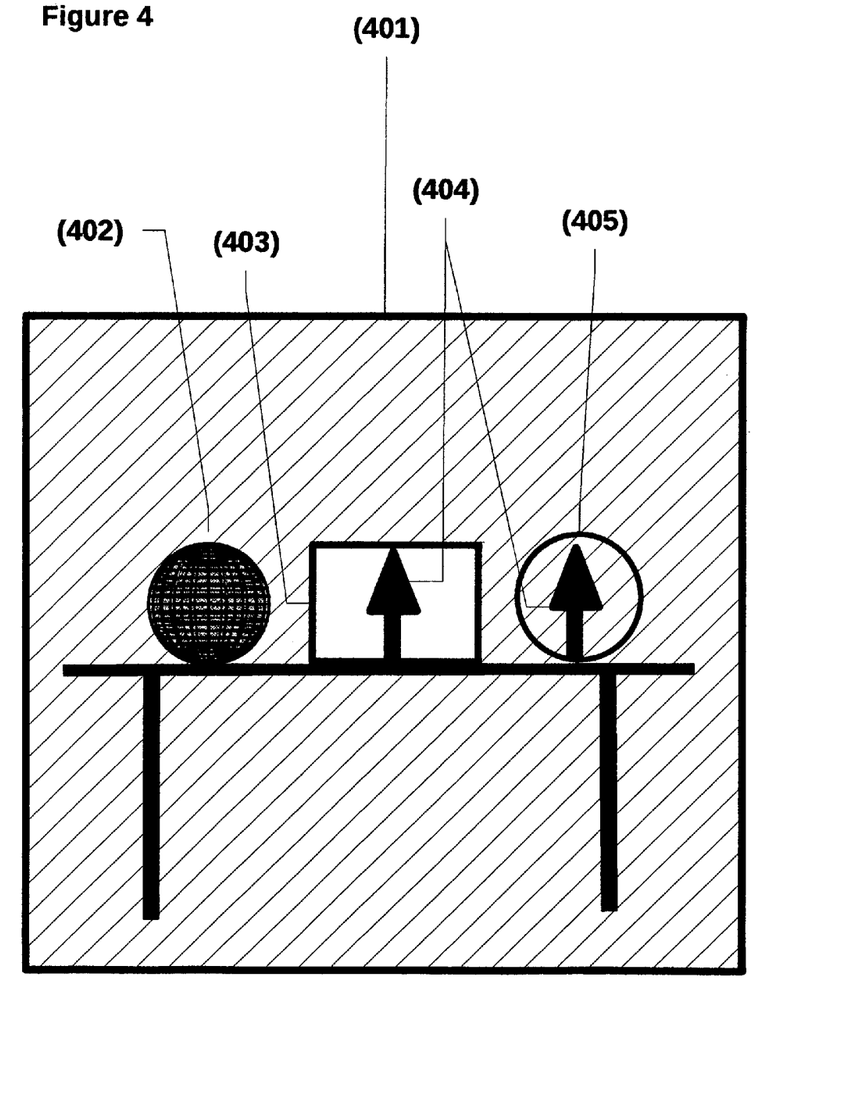
FIG. 4 depicts three sensation generating devices on a table in a room with diagonal stripe patter on the wall paper. Two of the devices are waxel devices and the device located in the middle is a conventional LCD monitor.

FIG. 4 depicts a few sensation rendering devices laying on top of a table. The wall of the room (401) has a texture gray slanted lines as drawn. An inactive waxel enabled sphere (402) is an uninteresting opaque object. The waxel enabled sphere is additionally depicted rendering a Christmas tree (402) within. A typical computer screen (403) would render the tree (404) on an artificial background that does not match the background of the room (401). A waxel covered rendering device (405), can, however render the tree (404) as if it sat on the table, displaying correct background texture of gray slanted lines where there is no tree.

Figure 5:
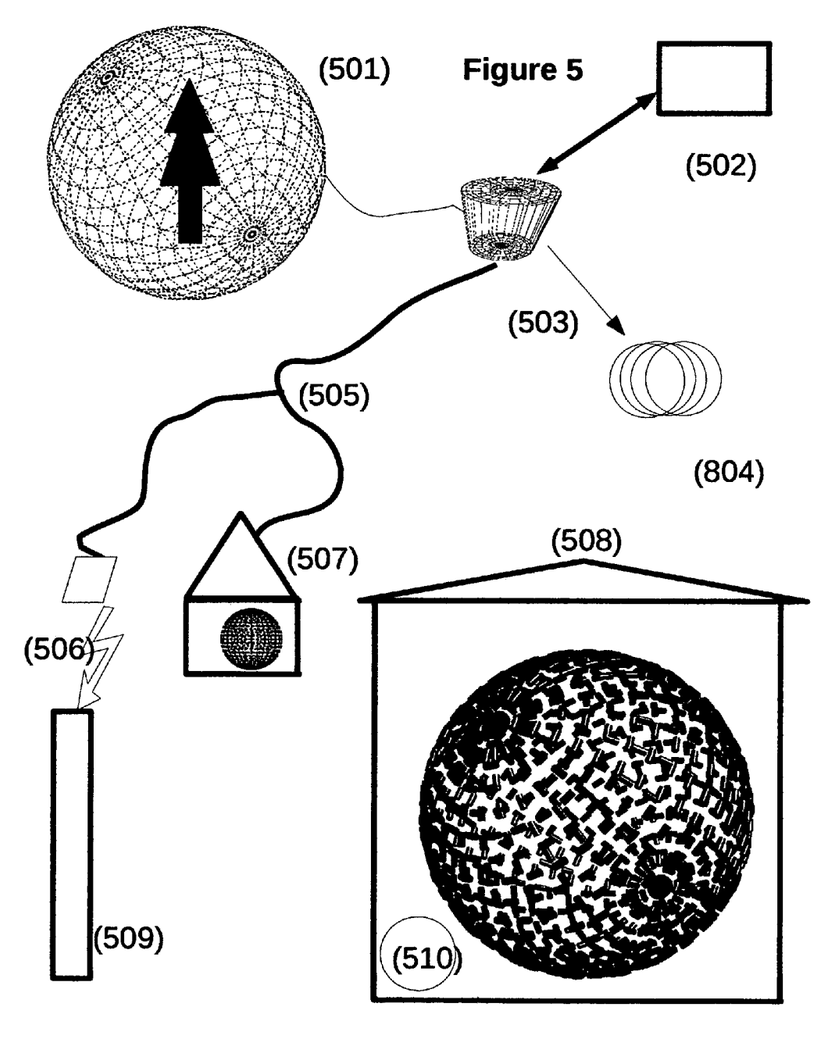
FIG. 5 depicts the entire ecosystem enabled by the current invention.

FIG. 5 depicts the entire ecology that are possible due to the current invention. The various stages include recording, editing and generating, storage, transmission, home, theater and billboard and poster reproduction. The entire process begins with a configured waxel device (501). The configuration for target volume and observation volume are entered into the computer controller. The Christmas tree inside the target volume is recorded and presented to the any observer in the configured observation volume. Computer aided editing of the recording may be performed live at time of recording ox later after recording (502). Editing system (502) can introduce computer aided generation of sensations not originally recorded. The computer generated sensations may be based on live action recording from a device similar to (501) or it may be completely independent and void of live action recording. The recording is stored in hard drives or other mass persistent storage device (503). The data can be burned onto mobile disks such as CD-ROM discs, DVD, BlueRay or similar ROM media (504). The data, in addition be being stored on stationary mass storage and mobile storage media and can be transferred via wired (505) or wireless network (506) to cloud based storage services. The waxel devices are depicted as home theater (507), commercial theater (508) and public posters and billboards (509). The movie is transferred to these devices via intranet (505), Internet (505), wireless (506) and mobile media (510).

Figure 6:
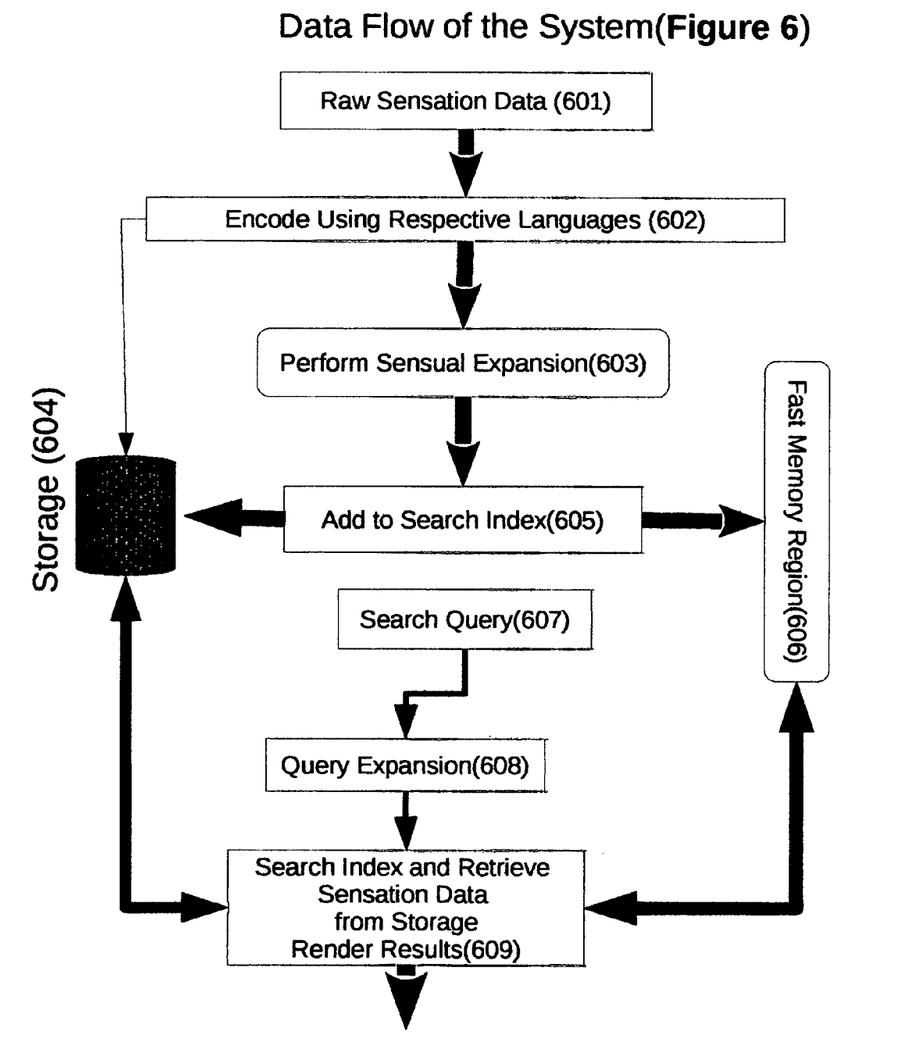
FIG. 6 depicts the flow of data within the search index.

FIG. 6 depicts the data flow of the system of this invention. Raw sensation data are sensed by the plurality of sensation devices and is represented by (601). After transform and processing by the system, the persistent Storage (604) and the index stored in Fast Memory Region (606) will contain all updated information from (601). Additional interactive component (607) receives user query sensations and eventually produces data (609) that can be consumed by the sensation producing devices to render the search results.

Further detail, still regarding the invention of FIG. 6, the data is processed by a processor and encoded using languages. The language used by the present invention used for encoding sensations are languages with alphabets. The alphabets of language used must have symbols that are well ordered. A simplest example is the English language, one could use, for example, the subject himself as a sensor and ask him to produce observed sensations using English language; the language could be subjective, such as sensation of pain on a scale of 1 to 10 1 being not painful and 10 being most painful; the language is most often numeric (storing temperatures in centigrade, pressure in inches of mercury, or numeric vectors; additional languages may have infinite alphabets, Hanzi characters for alphabet, Arabic numerals, etc. The specific design of language is dependent on the type of sensation being recorded and the desired fidelity and resolution as well as depending on the type of search query the system will support. Each sensation should have it's own language and alphabet for encoding sensations of that type. The language encoded data is then stored in the persistent storage (604)

Further detail, still regarding the invention of FIG. 6, the sensation as represented by their languages must be prepared before insertion into the database (603). An additional step to expand the sensation is taken to help increase recall of later search. For example, one index we may create is one where keys are Morton code transform of all of the sensations encoded in their respective language. Which order the sensations are encoded may be predetermined or dynamically determined based on quality of the sensations, quality of the language coding of the sensations (empirical properties such as entropy), or quality of the sensors making the recording. This encoding requires that the language additionally be big-endian. Query expansion in the case of this example index is simply coordinate-wise expansion of each sensation to create a sensation interval which surround the original sensation. An example of query expansion is to index the temperature range (5,15) instead of the single temperature 10.

Further detail, still regarding the invention of FIG. 6, the and expanded search key is inserted into the search index. The search index is both persisted into persistent storage and into a fast memory region for faster search performance.

Further detail, still regarding the invention of FIG. 6, A sensational search query is received by the system (607). Sensational queries can be manually generated sensations described in language of that sensation; or queries can be constructed by using sensations previously observed by the searcher, therefore the searcher can indicate to the system exactly where to retrieve the query sensations; or queries can be constructed by recording new sensations mimicking those sensations that the searcher wishes to find.

Further detail, still regarding the invention of FIG. 6, The above gathered sensual query is encoded using the languages of the current recording and query expansion is performed. Similar to key expansion above, query expansion (608) attempts to increase recall of search by loosening the search query from a single original query sensation to a range of possible sensations about the original query sensation. In the example above, a search for temperature of 10 degrees can turn into a range query of (5,15). In case of multiple sensations, in the same example, the query is expended sensation-wise and then re-encoded to produce a single range query. The search is performed in fast memory region (606) and the results are retrieved from the Storage (604) and reproduced using the system's sensation producing devices (609)

Further detail, still regarding the invention of FIG. 6, The input sensors that feed this system (601) may consist of Camera, HD Camcorder, light field camera, tape recorder, radiation detector, radio detector, radar, sonar, lidar, magnetometer, barometer, accelerometer, hydrometer, etc.

Further detail, still regarding the invention of FIG. 6, the supported observers may be more than humans. Sensation and storing language must support faithful reproduction for animal, insect, or robotic system with aforementioned sensors. The supported observer types must be specified before recording and cannot change during or after recording.

Further detail, still regarding the invention depicted in FIG. 6, the supported situations may additionally include the person being myopic or hyperopic, wearing polarized 3D glasses or other temporary accessories or permanent implants producing altered sensations, observer is upside down with respect to gravity, observer is right-ear-up with respect to gravity, observer's temperature is above normal, the observer is feeling sad or depressed, the observer may point flash light or other probes that cause at most quantum or microscopic changes in the target volume, the observation volume may have 20% higher humidity than the target volume.

CONCLUSION, RAMIFICATIONS AND SCOPE

Accordingly, the systems and methods described above of the preferred embodiment can be used to faithfully reproduce sensations for an observer with said situations in said observation volume observing said target volume. The recording and reproduction method provides for searching of location and situation in which an observer may experience a desirable sensation. Furthermore, the recording and reproduction has the additional advantages in that:

The volume in which sensation is produced (target volume) and the volume in which the observer reside (observation volume) is well specified by the operator and adjustable by the present invention.

The situations under which sensations can be reproduced faithfully are well specified so as to not induce undesirable surprises when observations are being made.

The recording and reproduction can be made at any resolution as supported by available sensors and sensation reproducing devices.

The types of sensations that can be recorded and reproduced is expanded beyond those that existing commercial systems (aka 4d movie experiences) can support including, only, sights, sounds, moisture, vibration and temperature.

Psychological and physiological conditions are taken into consideration during recording and reproduction.

The recording and reproduction can be optimized for non-human observers

Searching for sensations is enabled.

Although the description above contains many specifics, these should not be construed as limiting the scope of the embodiment but as merely providing illustration of some of these embodiments. For example the index for sensation need not be a Morton coded one dimensional interval tree, it can be any search system that supports efficient storage of ranges and range query of many well ordered keys. Additional languages and alphabets may be introduced to describe location and situation of observers such that the search index can perform query having not only desirable sensational but also desirable location and situation components. The mechanical time-multiplexed waxel sensors can be replaced with a static sensor element that simultaneously measure sensations in all directions that the waxel can sense at. The mechanical time-multiplexed waxel orienting component can similarly be replaced by micro-electro-mechanical components.

Thus the scope of the embodiment should be determined by the appended claims and their legal equivalents, rather than by the examples given.

What is claimed is:

1. A sensation recording, reproduction and searching system comprising:
    waxels which is a device holding sensors and sensation projectors on its head: waxel head, including the sensors and projectors, is mounted to waxel's base through two gimbals, linear and torsional actuators on the waxel shifts and rotates the waxel head to direct the sensor and projectors' direction of operation;
    a fixed structure having sufficient area facing the target volume when recording, the target volume being space and observer situations of sensational interest;
    said structure having sufficient area facing the observation volume when reproducing, the observation volume being space and situation from which observer are designated to observe sensations
    wherein when the target volume is partially immersed in a body of water during recording; the observation volume is also partially immersed in a body of water during reproduction; the two volumes do not intersect and the bodies of water immersing these two volumes are substantially separate bodies of water;
    wherein waxels arranged on said structure with sufficient density;
    a computer controller;
    wherein each waxels connected to the computer controller using wires;
    a persistent storage device connected to the computer controller for storing recorded sensations;
    a fast region of memory for storing search index based on recorded sensations;
    a software program stored and operating in the computer controller circuitry comprising:
    program routines to react to waxel input by performing signal processing, appending the current timestamp, target and observation volume information to the processed input signal from said sensors into the persistent storage;
    program routines to react to waxel input by performing signal processing to compute the projections necessary to reproduce recorded sensations in the observation volume;
    program routines to direct waxel direction based on requirements of observation and target volume;
    program routines for creating or update of search index by converting sensation into a search key and associating with said key the time, location and situations of the observer when the sensation was gathered;
    program routines that perform search based on query which are sensations represented by the raw language;
    program routing to perform search receiving raw language query obtained from examples within existing sensation store or recording a new query sensation recorded using a compatible waxel device;
    program routines to perform query expansion, using said search index to perform search, and provide an application programming interface to: specify target volume and observation volume; set recording and reproduction parameters; and operate said indexing and search capabilities.

2. The system of claim 1 wherein the persistent storage is a cloud storage service.

3. The system of claim 1 wherein the waxel sensor comprising at least one of microphone, proximity sensors such as radar, sonar, shape detectors: lidar, fluid sensors: microphone, barometer, hydrometer, speedometer, sensors that reference a world or object: magnetometer, accelerometer, angular accelerometer (torque sensor) light sensors: camera, light field camera; radiation detectors: radio detector, radar, x-ray sensor, ultra-violet sensor, infrared sensor, Geiger counter, sub-atomic detectors: neutron detector, neutrino detector, a human or organism.

4. The system of claim 1 wherein the search index is a data structure supporting fast indexing and range query of search keys that are morton coded sensations each represented by a big-endian language having a well ordered alphabet.

5. A method for recording, reproducing and searching sensations:

providing waxels which are to be constructed by: bundling sensors and sensation projectors together into waxel head, connecting waxel head with a base using gimbals, torsional actuator, and linear actuator, connecting sensor and projectors on the waxel head to the base using wires;

providing a fixed structure having sufficient area facing the target volume when recording, the target volume being space and observer situations of sensational interest;

providing said structure having sufficient area facing the observation volume when reproducing, the observation volume being space and situation from which observer are designated to observe sensations;

wherein when the target volume is partially immersed in a body of water during recording; the observation volume is also partially immersed in a body of water during reproduction; the bodies of water immersing these two volumes are substantially separate bodies of water;

arranging waxels on said structure with sufficient density;

providing a computer controller;

connecting waxels to the computer controller using wires;

providing a persistent storage device connected to the computer controller for storing recorded sensations;

providing a fast region of memory for storing search index based on recorded sensations;

developing a software program which is to be compiled and optimized before being stored and operated in the computer controller circuitry:

developing program routines to react to waxel input by performing signal processing, appending the current timestamp, target and observation volume information to the processed input signal from said sensors into the persistent storage;

developing program routines to react to waxel input by performing signal processing to compute the projections necessary to reproduce recorded sensations in the observation volume; incorporating artificial intelligence using programming techniques in said signal processing routines to include, not exclusively, search, expert systems, deductive algorithms, inductive algorithms such as machine learning, supervised learning, active learning, online learning, reinforcement learning, natural language processing, statistical learning such as Bayesian methods, unsupervised learning, and artificial neural networks;

developing program routines to direct waxel direction based on requirements of observation and target volume;

developing program routines for creating or updating of search index by converting the sensation into a search key and associating with said key time, location and situation of the observer when the sensation was gathered;

developing program routines that perform search based on query which are sensations represented by the raw language;

developing program routing to perform search receiving raw language query obtained from examples within existing sensation store or recording a new query sensation recorded using a compatible waxel device;

developing program routines to perform query expansion, using said search index to perform search, and exposing an application programming interface to: specify target volume and observation volume; set recording and reproduction parameters; and operate said, indexing and search capabilities.

6. The method of claim 5 where the a sensation of said sensations is one of: visual, audio, tactile, temperature, vibration, psychological and physiological.

7. The method of claim 5 where the target volume is partially immersed in a body of water and the observation volume is also partially immersed in the same body of water the two volumes intersect substantially.

8. The method of claim 5 where the observer is at least a human, a collection of sensors such as an HD-camera or a light field camera, an animal such as dog, fish or compound-eyed insect.

9. The method of claim 5 where the sensors installed on the waxel bead is at least one of microphone, proximity sensors such as radar, sonar, shape detectors: lidar, fluid sensors: microphone, barometer, hydrometer, speedometer, sensors that reference a world or object: magnetometer, accelerometer, angular accelerometer (torque sensor) light sensors: camera, light field camera, radiation detectors: radio detector, radar, x-ray sensor, ultra-violet sensor, infrared sensor, Geiger counter, sub-atomic detectors: neutron detector, neutrino detector, a human or organism.

10. The method of claim 5 where the sensation reproducing device is at least one of: HD projector, light field rendering device, audio speaker system, air humidifier, air dehumidifier, sonar speaker, radar emitter, laser emitter, magnetic field generator, radiation emitter, sub-atomic particle emitter.

11. The method of claim 5 where the supported observer situation additionally include at least one of:
    observer has Myopia/Hyperopia having equal strength in both eyes;
    observer has sensation producing implants producing sensations that normal person may or may not sense, the sensation being produced is faithful to the specific person and implantation;
    observer is wearing corrective lenses;
    observer is upside-down relative to gravity in the target volume;
    observer's left ear faces downward relative to gravity in the target volume;
    observer has a fever;
    observer is sad;
    observer is pointing a flashlight into the target volume;
    humidity in observing volume is 20% higher than those in the target volume.

12. The method of claim 5 where storage of said sensations into said data persisting means include storing some sensation rote while storage of some other sensation heuristically compressed before storing.

13. The method of claim 5 wherein the data persisting means stores data into a cloud storage service.

14. The method of claim 5 where language of said languages having at least one of:
    the English alphabet;
    an alphabet containing Chinese Hanzi characters;
    an alphabet containing the Arabic numerals;
    an alphabet having infinite symbols;
    an alphabet who's set of symbols are radix of numeric language such that each symbol can only be used for some restricted set of digits;
    a big-endian ordering of symbols from it's alphabet.

15. The method of claim 5 further comprising of:
    providing a fast access memory region capably of fast random writes and random accesses;

a data indexing means which the recording can be indexed and stored in the fast access memory region such that repeated queries can be made using said languages of said sensations resulting in a list of observers, their locations and other situations at which they can observe the query sensations or similar query sensations, the actual observable sensation themselves and the similarity of the observable and query sensation;

a sensation input means which one of the said observers can input a query sensation;

producing a list of sensations, situations and relevance by obtaining a query sensation from the said input means searching for sensations by said data indexing means, producing the resulting list by appending to each sensation and situation a heuristic distance calculated based on the actual index key of the search result and the original unexpended query index key;

reproducing the said search result sensation for the observer using said sensation producing devices;

whereby the observers search for a desirable sensation and find what time, location, orientation and other situations that he must be in in order to sense those sensations; choosing from the result of search the observer may then experience the faithful reproduction of said sensation or similar sensations that result from the search.

16. The method of claim 15 wherein said input means is by example from the same, another preexisting or another live recorded instance of said recordings.

17. The method of claim 15 wherein said indexing of each sensation is augmented with an interval of sensations around the original sensation prior to insertion into the said data index means whereby the recall of relevant sensations is increased.

18. The method of claim 15 further comprising of a search engine which is capable of using said sensation index to answer queries that are logical formula having predicates about the sensations whereby complex queries regarding sensations can be made to determine specifically which observers can sense the query sensations, the locations at which they can sense it and under what situations they can sense it.

19. The method of claim 15, further comprising:

requiring alphabet of said language to be big-endian;

combining said alphabets using union operation to create a set of alphabet for the index language;

establishing a fixed ordering over said languages, said data indexing means is a data structure that performs fast indexing and range and stabbing query retrieval of Morton coded sensations in said respective languages, comprising:

establishing one or a plurality of range query-able key-value search data structures, in said fast access memory region, having different shards or facets in different data structures, further having comparison function comparing each symbol using the ordering of alphabet the symbol originated from;

constructing a big-endian index key for each sensation of said sensation as recorded for each type of observer of said observers having each situation of said situations by interleaving symbols of description of the sensations one symbol at a time from highest ranked language to the lowest ranked language ranked using said language ordering; and inserting said index key into said search data structure having the situation as the value of the key-value store, constructing a query key based on said query sensation search for query sensation by: performing, optionally, query expansion about each radix of said query key, performing stabbing or range queries using the query or result of query expansion.

20. The method of claim 19 wherein said ordering of languages is determined by empirical entropy, highest entropy having the highest rank.

\* \* \* \* \*